United States Patent
Krishnan et al.

(10) Patent No.: US 7,885,746 B2
(45) Date of Patent: Feb. 8, 2011

(54) SYSTEM ARCHITECTURE OPTIMIZATION FOR ELECTRONIC TRANSMISSION RANGE SELECTION

(75) Inventors: Ananth Krishnan, Ypsilanti, MI (US); David A. Thatcher, Troy, MI (US); Timothy J. Hartrey, Brighton, MI (US)

(73) Assignee: GM Global Technology Operations, Inc.

( * ) Notice: Subject to any disclaimer, the term of this patent is extended or adjusted under 35 U.S.C. 154(b) by 1356 days.

(21) Appl. No.: 11/389,566

(22) Filed: Mar. 24, 2006

(65) Prior Publication Data

US 2006/0229789 A1 Oct. 12, 2006

Related U.S. Application Data

(60) Provisional application No. 60/668,753, filed on Apr. 6, 2005.

(51) Int. Cl.
*B60K 23/00* (2006.01)
(52) U.S. Cl. .................................. 701/51; 180/233
(58) Field of Classification Search .................. 701/51; 180/233, 247, 249; 477/34, 36, 107, 115; 475/198, 206
See application file for complete search history.

(56) References Cited

U.S. PATENT DOCUMENTS

| | | | |
|---|---|---|---|
| 4,438,342 A | 3/1984 | Kenyon | 290/45 |
| 4,493,228 A * | 1/1985 | Vukovich et al. | 477/109 |
| 4,687,983 A | 8/1987 | Beyn | 322/28 |
| 5,411,110 A * | 5/1995 | Wilson et al. | 180/247 |
| 5,522,777 A * | 6/1996 | Baxter et al. | 477/36 |
| 5,582,263 A * | 12/1996 | Varma et al. | 180/247 |
| 5,967,757 A | 10/1999 | Gunn et al. | 417/34 |
| 5,993,354 A * | 11/1999 | Winks | 477/107 |
| 6,253,138 B1 * | 6/2001 | Shober et al. | 701/51 |
| 6,472,790 B2 | 10/2002 | Rose, Sr. | 310/184 |
| 6,522,105 B2 | 2/2003 | Kodama et al. | 320/155 |
| 6,718,927 B2 | 4/2004 | Goetze et al. | 123/179.3 |
| 6,919,648 B2 | 7/2005 | Bolz et al. | 290/40 |

OTHER PUBLICATIONS

PCT Search Report mailed Jul. 6, 2006.
International Search Report for Appln. No. PCT/US06/10890 dated Aug. 7, 2006 corresponding to the subject application.

* cited by examiner

*Primary Examiner*—Dalena Tran

(57) ABSTRACT

A transmission control system for a vehicle includes a first module that generates a first modified signal based on a first position of a driver input device and a second module that receives the first modified signal from the first module. The second module generates a second modified signal based on a second position of the driver input device and regulates operation of a transmission of the vehicle based on the first and second modified signals.

18 Claims, 2 Drawing Sheets

SYSTEM ARCHITECTURE OPTIMIZATION FOR ELECTRONIC TRANSMISSION RANGE SELECTION

CROSS-REFERENCE TO RELATED APPLICATIONS

This application claims the benefit of U.S. Provisional Application No. 60/668,753, filed on Apr. 6, 2005.

FIELD OF THE INVENTION

The present invention relates to transmission control systems, and more particularly to an optimized control system architecture for an electronic transmission range selection (ETRS) system.

BACKGROUND OF THE INVENTION

Motorized vehicles include a power plant (e.g. engine or electric motor) that produces driving power. The driving power is transferred through a transmission to a driveline for driving a set of wheels at selected gear ratios. As is well known, automatic transmissions shift automatically to the appropriate gear ratio based on various vehicle operating conditions including speed and torque. Typically, a desired transmission operating mode or range is selected by the vehicle operator. The ranges provided by most automatic transmissions generally include Park, Neutral, Reverse and Drive. In Drive, the automatic transmission automatically shifts between three, four, five or even six different forward gear ratios based on the vehicle operating conditions.

Traditionally, a driver interface device is provided which the vehicle operator shifts to select the desired transmission range. The driver interface device is linked to the automatic transmission by a range shift mechanism which typically includes a series of interconnected mechanical devices such as levers, push/pull rods, cables and the like.

More recently, electronic transmission range selection (ETRS) or "shift-by-wire" range shift systems have been developed. Typically, a shift-by-wire range shift mechanism is based on detection of an external input through a driver interface device. Switches associated with the driver interface device send a mode signal to a transmission control module that is indicative of the selected transmission range. Thereafter, the control module actuates electric motors, solenoids and/or hydraulics to operate the transmission in a manner corresponding to the range select position.

SUMMARY OF THE INVENTION

A transmission control system for a vehicle includes a first module that generates a first modified signal based on a first position of a driver input device and a second module that receives the first modified signal from the first module. The second module generates a second modified signal based on a second position of the driver input device and regulates operation of a transmission of the vehicle based on the first and second modified signals.

In one feature, the transmission control system further includes a first sensor that generates a first signal based on the first position, wherein the first signal is received by the first module, and a second sensor that generates a second signal based on the second position, wherein the second signal is received by the second module.

In another feature, the second module regulates operation of the transmission based on one of the first and second modified signals when the first and second modified signals are equivalent.

In another feature, the second module regulates operation of the transmission in a fault mode when the first and second modified signals are not equivalent.

In another feature, the second module regulates operation of the transmission in a fault mode if the first and second modified signals are not equivalent within a threshold time period.

In still another feature, the first position is communicated to the first module as an analog signal and the second position is communicated to the second module as an analog signal.

In yet another feature, the first modified signal is communicated to the second module as a digital signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
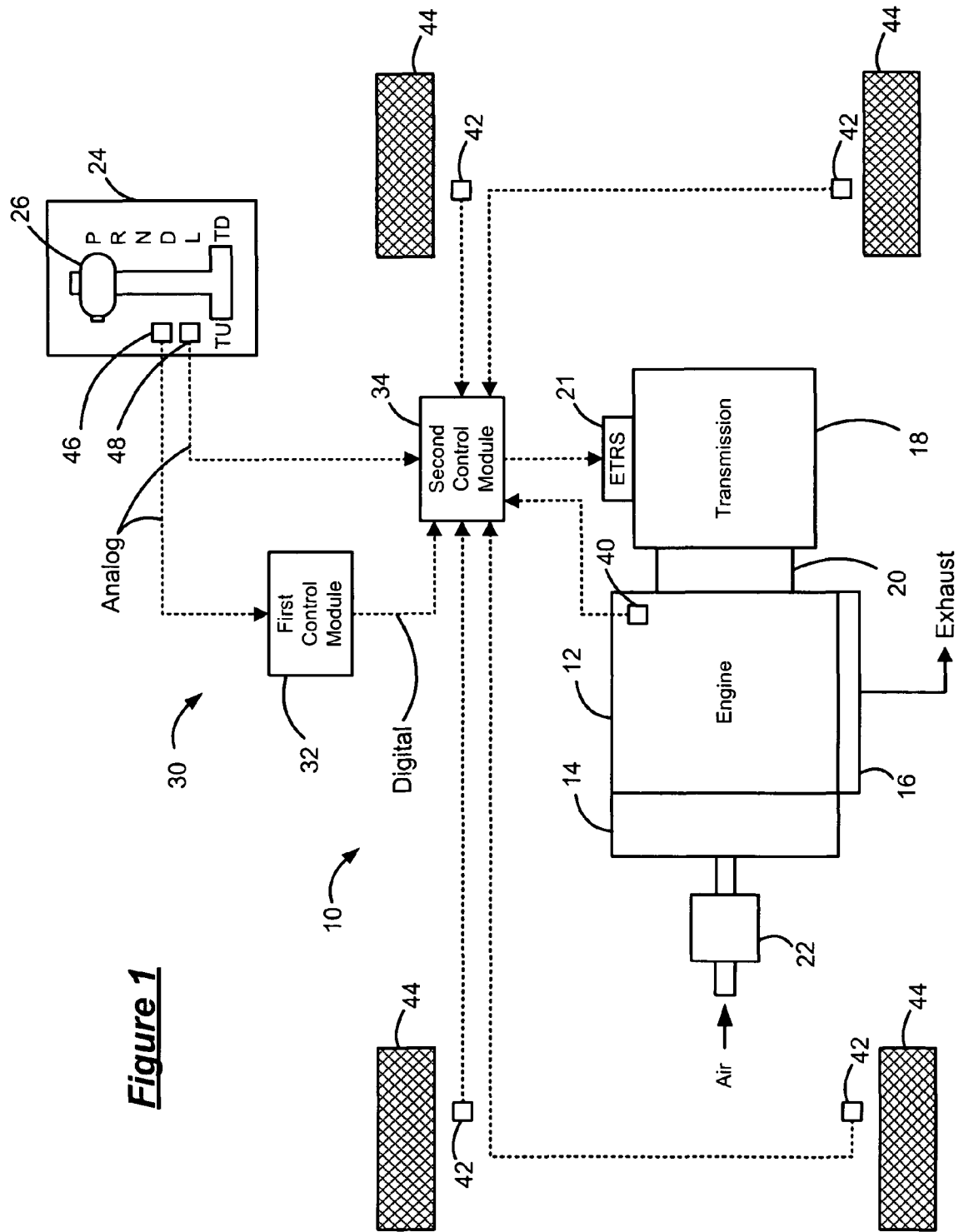
FIG. 1 is a schematic illustration of an exemplary vehicle including an optimized control system architecture according to the principle of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system 10 is illustrated. The engine system 10 includes an engine 12, an intake manifold 14, an exhaust manifold 16, a transmission 18 and a coupling device 20. The transmission 16 includes an automatic transmission and the coupling device 20 includes a torque converter. The transmission 18 includes an electronic transmission range selector (ETRS) system 21 that shifts ranges of the transmission 18 based on signals generated by a control system, as discussed in further detail below. An exemplary ETRS system is disclosed in commonly assigned U.S. Pat. No. 6,880,419, issued on Apr. 19, 2005, the disclosure of which is expressly incorporated herein by reference.

The engine 12 combusts an air and fuel mixture within cylinders (not shown) to drive pistons (not shown) that drive the transmission through the coupling device. Air is drawn through a throttle 22 and into the intake manifold 14, which distributes air to the cylinders. Exhaust from the combustion process is exhausted from the cylinders and into the exhaust manifold 16. The exhaust is treated in an exhaust system (not shown) and is released to atmosphere.

A driver input device (DID) 24 is also included and enables the driver to indicate a desired transmission operating mode. More specifically, the DID 24 is illustrated as a PRNDL lever 26 that enables a driver to shift the operating range of the transmission between park (P), reverse (R), neutral (N), drive (D) and low drive (L). The DID 24 can also include tap-shift inputs (i.e., tap-shift up and tap-shift down) that enable a driver to command gear shifts.

The engine system 10 further includes a control system 30 having a first control module 32 and a second control module 34. The DID 24 communicates with the first and second control modules 32, 34 over analog communication paths and the first control module 32 communicates with the second control module 34 over digital communication path including a local area network (LAN) or high-speed data bus. The first control module 32 regulates operation of various vehicle systems including, but not limited to, lights, power windows, power seats and the like. For example, the first control module 32 can include a body control module (BCM) that provides a common control unit for non-critical vehicle systems.

The second control module 34 regulates operation of the transmission 18 and can include a transmission control module (TCM). The second control module is a secure control module. The term "secure" indicates that the second control module includes redundant software paths and a redundant micro-processor that functions as a watch-dog to ensure calculations and processing are accurate. The second control module 34 regulates operation of the transmission 18 based on the driver input via the DID 24 and/or vehicle operating parameters (e.g., engine RPM and wheel speeds). More specifically, the second control module 34 regulates operation of electric motors, solenoids and/or other actuating components to operate the transmission 18 into the desired range as indicated by the DID 24. For example, if the PRNDL lever 26 is in the P position, the second control module 34 can actuate a solenoid to lock a parking pawl of the transmission 18 to inhibit vehicle movement. Alternatively, if the PRNDL lever 26 is in the D position, the second control module 34 can actuate a solenoid to regulate hydraulic fluid flow to shift gears of the transmission 18 based on a shift schedule.

An engine speed sensor 40 is provided and generates an engine speed signal that is communicated to the second control module 34. Wheel speed sensors 42 are also provided and are associated with corresponding wheels 44 of the vehicle. The wheel speed sensors 44 generate wheel speed signals that are communicated to the second control module 34. First and second position sensors are disposed within the DID 24 and are responsive to the position of the PRNDL lever 26. For example, if the PRNDL lever 26 is in position R, the position sensors generate range signals indicating position R. The range signals are generally provided as analog signals (i.e., voltage signals) from the sensor. First and second range signals are communicated to the first and second control modules 32, 34, respectively.

The first control module 32 receives the first range signal and converts the first range signal to a first digital range (FDR) signal. More specifically, the first control module 32 processes the first range signal by multiplying the range signal by a calibration constant and converting the product into a digital signal. The second control module receives both the second position signal from the second position sensor 48 of the DID 24 and the FDR signal from the first control module 32. The second control module converts the second range signal into a second digital range (SDR) signal, as similarly described above with respect to the FDR signal.

The second control module 34 compares the FDR and SDR signals over a time period. By comparing the FDR and SDR signals within the time period, any lag in the FDR signal reaching the second control module 34 is accounted for. If the FDR and SDR signals are the same at some point during the time period, the second control module 34 regulates operation of the transmission based on the FDR and SDR signals and/or other signals including, but not limited to, the engine speed signal and the wheel speed signals. If the FDR and SDR signals are not the same at some point within the time period, the second control module 34 indicates a fault and operates the transmission 18 in a limp-home mode. That is to say, the transmission 18 is operated with reduced functionality to enable the driver to safely drive the vehicle home or to a service location.

Figure 2:
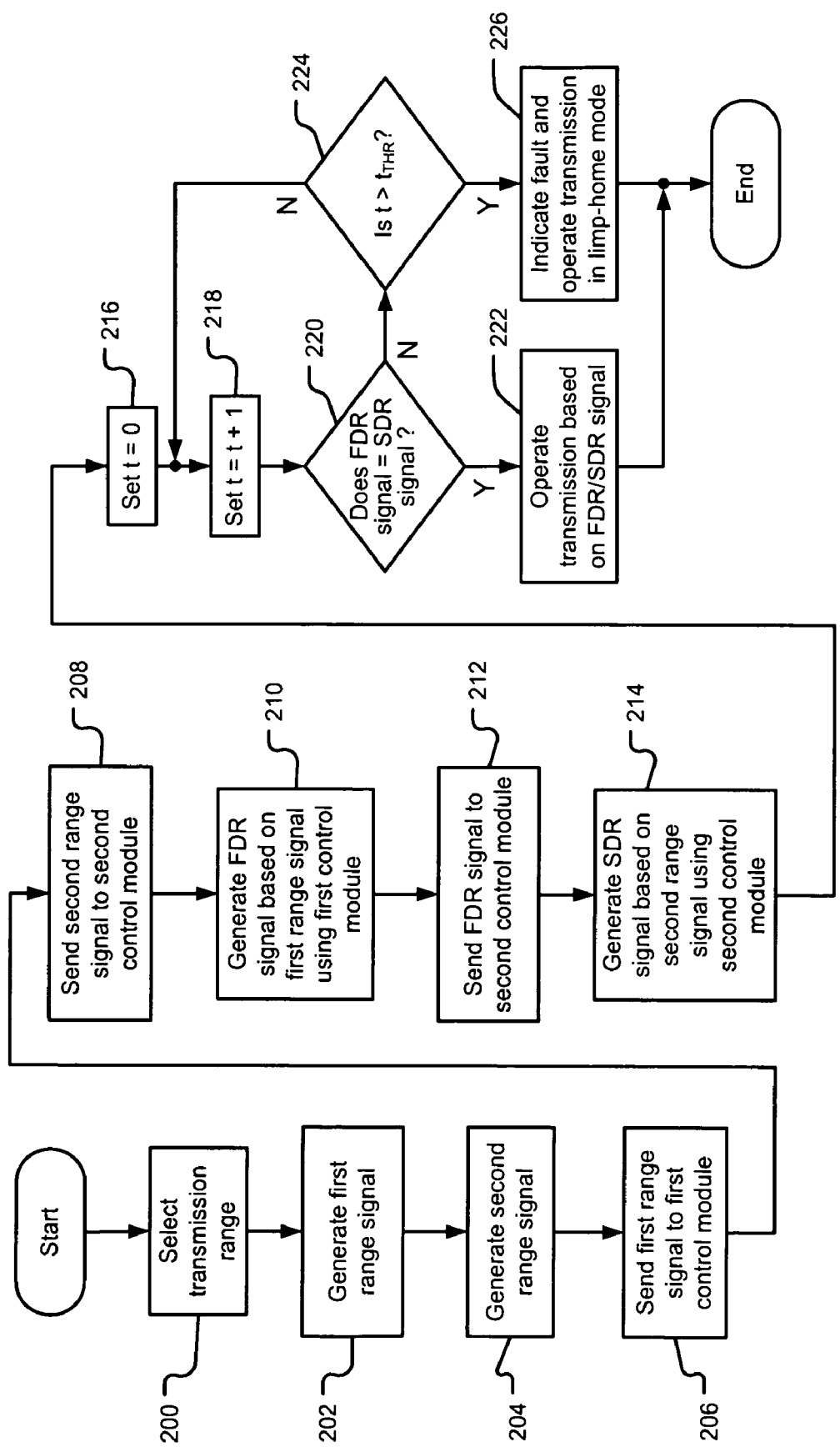
FIG. 2 is a flowchart illustrating exemplary steps executed by the transmission control of the present invention.

Referring now to FIG. 2, exemplary steps executed by the transmission control of the present invention will be described in detail. In step 200, a transmission range is selected. In steps 202 and 204, control generates first and second range signals, respectively. In step 206 and 208, control sends the first and second range signals to the first and second control modules 32, 34, respectively. In step 210, control generates the FDR signal based on the first range signal within the first control module 32. Control sends the FDR signal to the second control module 34 in step 212. In step 214, control generates the SDR signal based on the second range signal within the second control module 34.

In step 216, control sets a timer (t) equal to zero. Control increments t in step 218. In step 220, control determines whether the FDR signal is equal to the SDR signal. If the FDR signal is equal to the SDR signal control operates the transmission based on at least one of the FDR and SDR signals in step 222 and control ends. If the FDR signal is not equal to the SDR signal, control continues in step 224. In step 224, control determines whether t is greater than a timer threshold ($t_{THR}$). If t is not greater than $t_{THR}$, control loops back to step 218. If t is greater than $t_{THR}$, control indicates a fault and operates the transmission 18 in the limp-home mode in step 226 and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A transmission control system for a vehicle, comprising:
a first module that generates a first signal based on a position of a transmission shift lever; and
a second module that receives said first signal from said first module, that generates a second signal based on said position of said transmission shift lever and that regulates operation of a transmission of said vehicle based on a comparison of said first and second signals.

2. The transmission control system of claim 1 further comprising:
a first sensor that generates a first position signal based on said position, wherein said first position signal is received by said first module; and
a second sensor that generates a second position signal based on said position, wherein said second position signal is received by said second module.

3. The transmission control system of claim 1 wherein said second module regulates operation of said transmission based on one of said first and second signals when said first and second signals are equivalent.

4. The transmission control system of claim 1 wherein said second module regulates operation of said transmission in a fault mode when said first and second signals are not equivalent.

5. The transmission control system of claim 1 wherein said second module regulates operation of said transmission in a fault mode if said first and second signals are not equivalent within a threshold time period.

6. The transmission control system of claim 1 wherein said position is communicated to said first module as an analog signal and said position is communicated to said second module as an analog signal.

7. The transmission control system of claim 1 wherein said first signal is communicated to said second module as a digital signal.

8. A method of controlling a transmission of a vehicle, comprising:
generating a first signal based on a position of a transmission shift lever;
receiving said first signal;
generating a second signal based on said position of said transmission shift lever; and
regulating operation of said transmission based on a comparison of said first and second signals.

9. The method of claim 8 further comprising:
generating a first position signal based on said position, wherein said first position signal is received by a first module; and
generating a second position signal based on said position, wherein said second position signal is received by a second module.

10. The method of claim 8 further comprising comparing said first and second signals, wherein operation of said transmission is regulated based on one of said first and second signals when said first and second signals are equivalent.

11. The method of claim 10 further comprising generating a fault signal and operating said transmission in a fault mode when said first and second signals are not equivalent.

12. The method of claim 8 further comprising regulating operation of said transmission in a fault mode if said first and second signals are not equivalent within a threshold time period.

13. The method of claim 8 further comprising communicating said position as an analog signal.

14. The method of claim 8 further comprising communicating said first signal from a first module to a second module as a digital signal.

15. A method of controlling a transmission of a vehicle, comprising:
generating a first position signal corresponding to a position of a transmission range selector;
generating a first signal based on said first position signal;
generating a second position signal corresponding to said position of said transmission range selector;
generating a second signal based on said second position signal;
comparing said first and second signals over a threshold time period; and
regulating operation of said transmission based on one of said first and second signals if said first and second signals are equivalent within said threshold time period.

16. The method of claim 15 further comprising generating a fault signal and operating said transmission in a fault mode when said first and second signals are not equivalent upon expiration of said threshold time period.

17. The method of claim 15 further comprising communicating said first and second position signals as analog signals.

18. The method of claim 15 further comprising communicating said first signal from a first module to a second module as a digital signal.

* * * * *